Sept. 25, 1951 C. W. ZEES 2,568,840
AUTOMATIC COFFEE MAKER
Filed Nov. 10, 1948 3 Sheets-Sheet 1
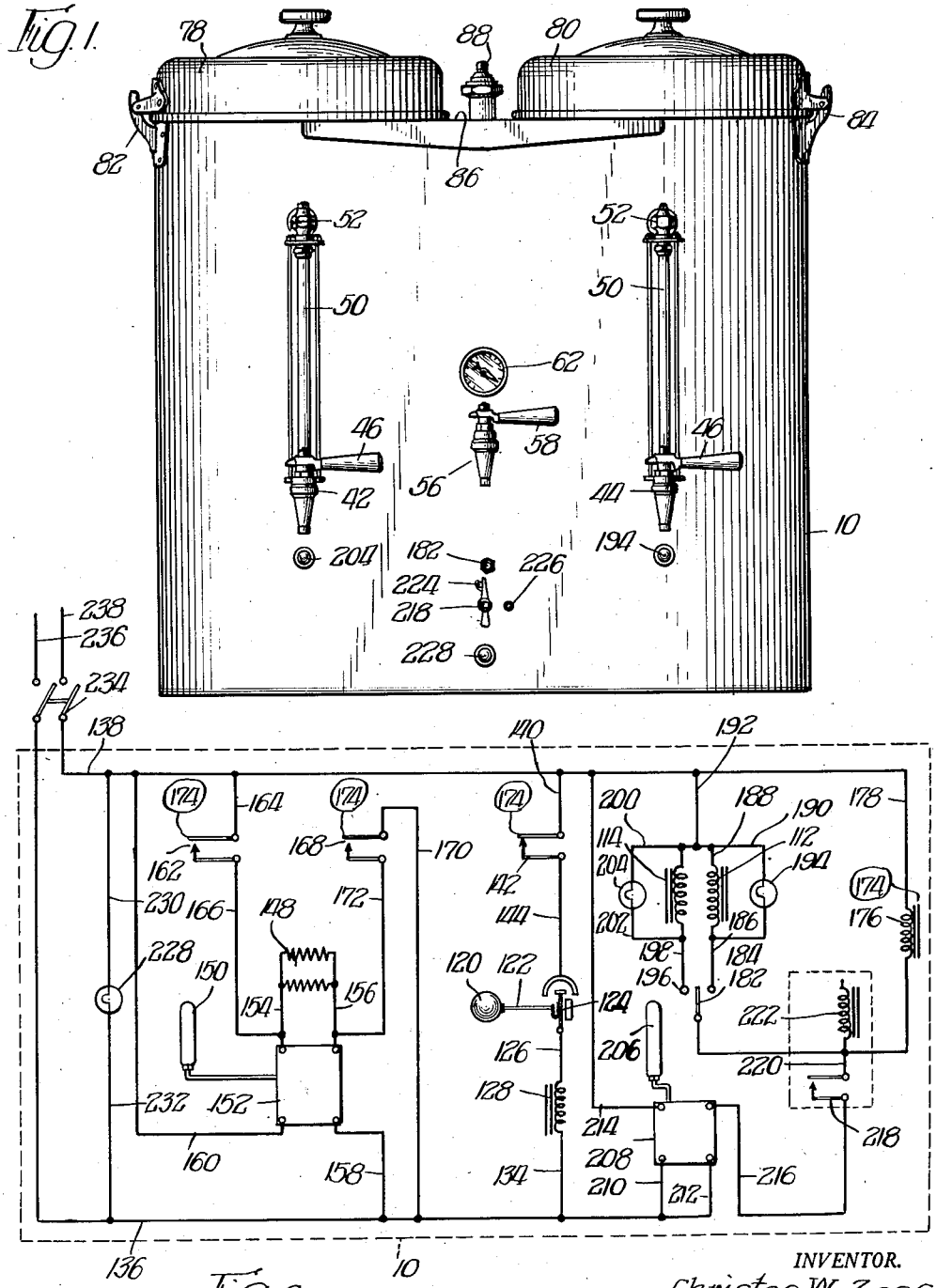
INVENTOR.
Christos W. Zees, Sept. 25, 1951    C. W. ZEES    2,568,840
AUTOMATIC COFFEE MAKER
Filed Nov. 10, 1948    3 Sheets-Sheet 2
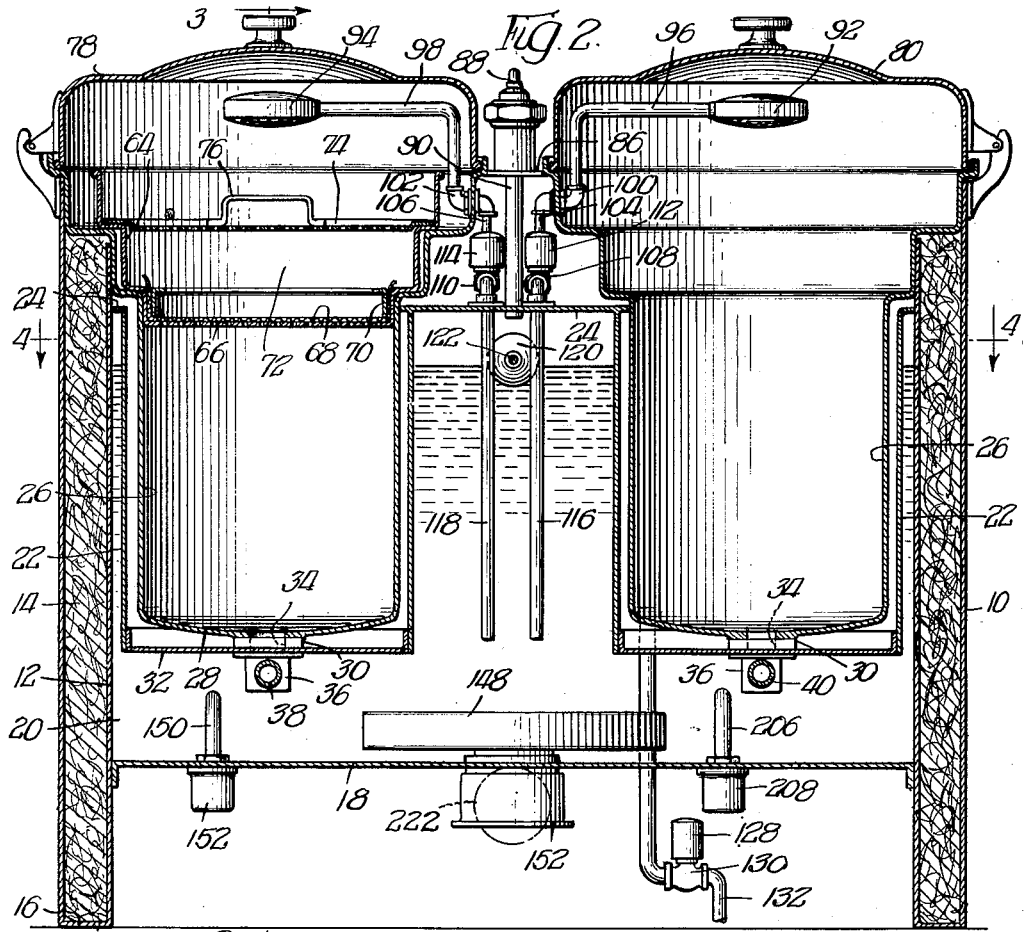
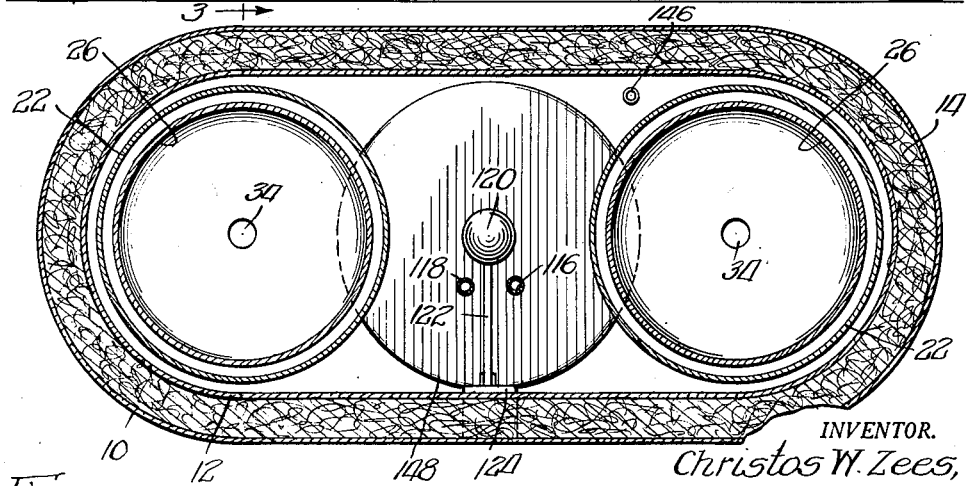
INVENTOR.
Christos W. Zees, Sept. 25, 1951  C. W. ZEES  2,568,840
AUTOMATIC COFFEE MAKER
Filed Nov. 10, 1948  3 Sheets-Sheet 3

INVENTOR.
Christos W. Zees,
BY
Wilkinson, Huxley,
Byron & Hume  Attys.

Patented Sept. 25, 1951

2,568,840

UNITED STATES PATENT OFFICE 2,568,840

AUTOMATIC COFFEE MAKER

Christos W. Zees, Chicago, Ill.

Application November 10, 1948, Serial No. 59,326

3 Claims. (Cl. 99—282)

1

This invention pertains to an automatic coffee making device.

An object of the invention is to provide an automatic coffee making device (urn) which brews coffee under uniform conditions wherein all of the steps in the brewing are predetermined.

Another object of the invention is to provide a coffee making device wherein coffee can be made on a shorter cycle than is generally used in machines wherein the steps are manually controlled.

Another object of the invention is to provide a coffee making device for making quantities of coffee in the conventional manner, but wherein the sequence of steps in the making of the coffee is automatically controlled.

Another object of the invention is to provide a coffee making device wherein the coffee is brewed by the device in the same manner each time the device is operated for brewing, and wherein coffee jars are provided in the device whereby coffee may be brewed alternately or selectively in said jars.

Another object of the invention is to provide a coffee making device wherein the water utilized in brewing the coffee is not supplied to the coffee until after a predetermined temperature has been reached.

Another object of the invention is to provide a coffee making device wherein the water syphoned to a coffee jar is shut off after a predetermined amount of water has been supplied to the jar.

Another object of the invention is to provide a coffee making device wherein fresh water is added to the water boiling or heating chamber after (as distinguished from during) each syphoning operation, whereby the temperature of the water supplied to the coffee jars can be maintained at a high predetermined temperature.

Another object of the invention is to provide a coffee making device wherein the supply of water to the water heating chamber is automatically shut off when the water in the chamber has reached a predetermined level and wherein the water in the water heating chamber is heated to a predetermined temperature after each fresh water supply.

Another object of the invention is to provide a coffee making device wherein the water in the water heating chamber is maintained at a predetermined high temperature for each succeeding brew.

Another object of the invention is to provide a coffee making device wherein the water in the water heating chamber is maintained at a predetermined high temperature but below boiling, but wherein while coffee is being brewed the water

2 is boiled for substantially only the time necessary for the brewing (substantially six minutes).

Another object of the invention is to provide a coffee making device which embodies all of the beforementioned advantages, but wherein the control is simple and at one point.

Another object of the invention is to provide a coffee brewing device wherein the liquid level of the water to be used is automatically maintained, and the temperature thereof maintained even after a brewing operation, and wherein an automatic control maintains the hot water in the water heating chamber for instant use.

Another object of the invention is to provide a coffee urn wherein the correct amount of water is syphoned to make coffee at each use, and wherein the heat is applied to the water at a point spaced from the bottom of the tank, therein preventing burning out of the tank bottom.

Another object of the invention is to provide a coffee urn which is insulated to retard radiation and thus prevents an undesirable effect upon the coffee making even in air-cooled establishments; and wherein indicators are provided to show if the device is in operation, which part of the device is in operation where a twin urn is utilized, and at what temperature the device is operating.

With these and various other objects in view, the invention consists of certain novel features of construction and operation as will be more fully described and particularly pointed out in the specification, drawings and claims appended hereto.

In the drawings which illustrate embodiments of the device and wherein like reference characters are used to designate like parts—

Figure 1 is a front elevation of a coffee making device or urn embodying the invention;

Figure 2 is a sectional elevation of the coffee making device illustrated in Figure 1, the section being taken substantially in a vertical plane through the longitudinal center of the machine;

Figure 4 is a sectional top plan view of the device illustrated in Figures 1 to 3, inclusive, the section being taken substantially in the plane as indicated by the line 4—4 of Figure 2;

Figure 6 is the wiring diagram for the automatic control of the coffee making device illustrated in Figures 1 to 4, inclusive.

Figure 3:
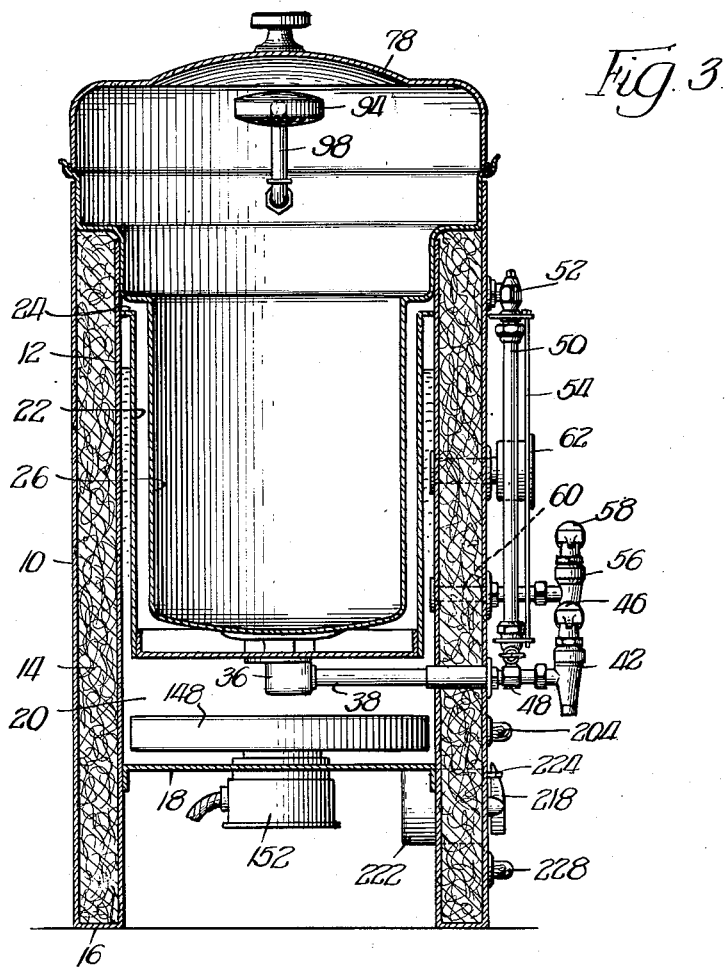
Figure 3 is a transverse sectional elevation of the device illustrated in Figures 1 and 2, the section being taken substantially in the plane as indicated by the line 3—3 of Figure 2.
Figure 5:
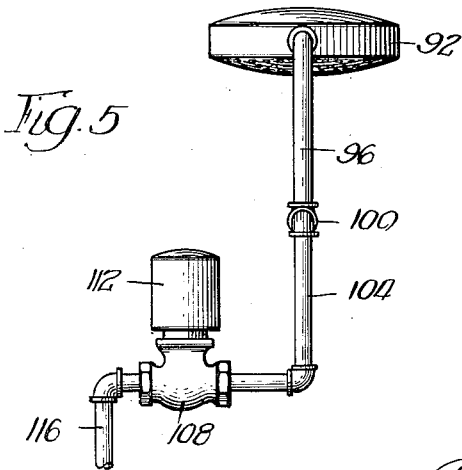
Figure 5 is an enlarged, fragmentary elevation of one of the syphons utilized in the device illustrated in Figures 1 to 4, inclusive, and the control valve for said syphon.

Referring first of all, more particularly, to the coffee making device or urn illustrated in Figures 1 to 5, inclusive, which is of the twin type, the device comprises a jacket 10, within which is disposed a casing 12, insulation 14 being disposed in the space between the jacket and casing. Bottom closure 16 is secured to the jacket and casing closing the insulation space, and the bottom member 18 is secured within the casing to form with the casing 12 a water heating compartment or chamber 20.

Spaced jar supporting jackets 22 are suspended within the casing 12 and secured in place by suitable bracing, a closure 24 being provided between said jackets, and with said jackets forming a top closure for the water heating compartment 20. Coffee jars 26 (designated as right and left hand coffee jars, for convenience) are removably supported in the jackets 22 and the bottoms 28 of said jars are each adapted to be supported on a resilient washer 30 fixedly supported on the bottom 32 of the jackets 22, bottoms 28 of the jars being apertured as at 34 whereby when the jars are in supported position on the washers 30, the apertures 34 will communicate with suitable apertures provided in the manifolds 36.

Manifolds 36 of the respective jackets are connected through pipes 38 and 40 to withdrawal or dispensing faucets 42 and 44, suitably controlled by handles 46. Pipes 38 and 40 are each provided with a fitting 48 to which the coffee (liquid) level gauges 50 of transparent material are connected, the upper ends of said gauges being vented to the atmosphere by means of the fittings 52 suitably secured to jacket 10, the gauges being protected by safety bars 54.

Hot water faucet 56, controlled by the handle 58, is connected through pipe 60 to the hot water heating compartment 20 and a suitable thermometer 62 is also connected to the hot water heating compartment whereby the temperature of the water in said compartment can be observed at any time.

The coffee basket or leacher 64 is adapted to be supported in each jar 26, being properly shouldered for support therein on complementary shoulders on said jar, the bottom 66 of said basket being apertured or perforated for permitting the flow of liquid through the basket and into the jar, filter 68 being adapted to be placed on the bottom 66 and maintained in place by means of the retaining ring 70.

A selected amount of coffee 72, properly ground, is adapted to be contained in the basket above the filter and confined by means of the perforated water spreader or deflector 74 supported on a shoulder in the basket and being adapted to be applied and removed by means of the handle 76. Each jar 26, and consequently the entire coffee making chamber and the space thereabove, is adapted to be closed by means of the movable tops or covers 78 and 80, hinged to the jacket 10 as at 82 and 84. A top closure 86 is provided for the jacket 10 and extends between the covers, and said covers interfit therewith, said closure being provided with the safety and vacuum valve 88 communicating with the water heating compartment 20 as through the pipe 90.

The valve 88 is a combination safety valve and vacuum valve, that is, it opens to the atmosphere to permit pressure above a predetermined amount to be exhausted to the atmosphere from the water heating compartment 20 when the pressure rises in the heating compartment above a predetermined amount, and also permits air at atmospheric pressure to be supplied to the water heating compartment 20 when vacuum conditions exist in said compartment, as where the temperature is quickly lowered when cold water is being supplied to the water heating compartment.

Above and near the center of the right and left hand coffee jars spray heads 92 and 94 are provided, respectively, said spray heads being connected, respectively, to pipes 96 and 98, swivelled as at 100 and 102 to suitable fittings whereby said heads may be rotated in substantially a horizontal plane to permit the ready insertion and removal of the leachers. Said fittings are connected through pipes 104 and 106 to the solenoid operated valves (supply valves) 108 and 110 controlled by solenoids 112 and 114, valves 108 and 110 being connected to the syphon tubes 116 and 118, the length of said tubes being determined to control the amount of hot water which is supplied to the coffee jars (for example three (3) gallons in the embodiment shown).

The water level or amount of water in the heating compartment 20 is controlled by means of the float 120 disposed in compartment 20, the float being connected through a suitable arm 122 to switch 124, one side of which is electrically connected as by means of the conductor 126 (Figure 6) to one side of the inlet or intake valve relay (solenoid) 128 (Figures 6 and 2) of the intake or inlet valve 130. The inlet side of said valve 130 is connected through piping 132 to a source of water supply and the other side of the relay 128 is connected through a suitable conductor 134 to the power line 136.

The wiring diagram illustrated in Figure 6 is for a two wire system and is shown in the dotted lines (jacket) 10, indicating it is in the urn. The other power line 138 is connected through conductor 140, switch 142 and conductor 144 to the other side of magnetic switch 124. Thus the float 120 in one position, that is, in the "full" position, serves to operate the switch 124 to open said switch de-energizing the relay 128 thereby rendering valve 130 inoperative, i. e. closed, whereby water cannot be supplied from the source of supply, through pipe 132, valve 130 and pipe 146, to the hot water heating compartment 20.

When the float 120 is in other than said position (i. e. lowered), switch 124 is adapted to be closed to energize the relay 128 to open valve 130 to permit the supply of water through pipe 132, valve 130, and pipe 146 to the hot water compartment 20 until the proper level is reached, at which time the float 120 becomes effective to open switch 124 to again render valve 130 inoperative.

Suitable heating means 148 is disposed adjacent but spaced from the bottom of hot water compartment 20 and is shown supported on the bottom 18. This heating element may be of any preferred construction and may be heated as by electricity, gas, steam, oil, etc., being shown as an electric heating means.

Thermostatic element 150 extends within the water heating compartment 20 and controls a thermostatic relay or control 152, said thermostatic control being electrically connected as at 154 and 156 to the heating means 148 whereby the thermostatic element 150 controls the heating output of the heating means 148 whereby the temperature of the water in the heating compartment 20 is maintained at a predetermined temperature, as for example, 208° F. One side of the thermostatic control is electrically connected as at 158 to the power line 136, while the other side of said thermostatic control is connected to the conductor 160 to the power line 138. Switch 162 is connected through conductor 164 to power line 138 and through conductor 166 to conductor 154. Switch 168 is connected through conductor 170 to power line 136 and through conductor 172 to conductor 156. Switches 162, 168 and 142 are disposed as switch elements of a relay 174, one side of the operating solenoid 176 of said relay 174 being electrically connected through conductor 178 to power line 138, the other side of said solenoid being electrically connected as through conductor 180 to the jar (right or left) selecting switch 182 (Figures 1 and 6). Switches 162 and 168 are adapted to be open when switch 142 is closed and vice versa. Said switch 182 is adapted to be biased either to the right or to the left, depending upon which jar 26 is to be used in the making of coffee at that particular instant.

If said switch 182 is biased to the right it closes contact 184 which is electrically connected by conductor 186 to one side of relay 112, the opposite side of said relay being connected through conductors 188, 190 and 192 to the power line 138, said conductor 186 being connected also through right-hand jar indicating lamp 194, and through conductors 190 and 192 to the power line 138. Thus if contact 184 is closed, lamp 194 indicates that the right-hand jar is being used.

If selecting switch 182 is biased toward the left, it closes contact 196 which is electrically connected as at 198 to one side of relay 114, the other side of said relay being connected through conductor 200 and conductor 192 to power line 138; and conductor 198 is also connected through conductor 202, to left-hand jar indicating lamp 204, and conductors 200 and 192 to the power line 138. Thus if contact 196 is closed, indicating lamp 204 indicates that the left-hand jar is being utilized.

Thermostat 206 is provided in the heating compartment 20 and is adapted to control a thermostatic relay or control 208, the thermostatic control being connected through conductors 210 and 212 to power line 136, and said thermostatic control 208 is connected through conductor 214 to power line 138, and connected through conductor 216 to one side of the timer and starting switch 218. The other side of the timer and starting switch 218 is connected through conductor 220 to conductor 180, and the switch 218 is controlled by timing means 222, such as a timing motor arranged to be set to open the switch 218 after a predetermined interval.

In the construction illustrated, the timing interval for making (three gallons) coffee in one jar 26 has been set for substantially six minutes though other intervals may, of course, be selected. Switch 218 is adapted to be rotated from open position in engagement with zero stop 224 to closed position in engagement with stop 226, and the timing motor 222 will rotate the switch for the timing interval (six minutes) at which time switch 218 is returned to open position in contact with stop 224. It is to be noted that even though switch 218 is set (closed), that is, rotated between zero stop 224 (Figure 1) and stop 226 that the switch will be ineffective and the timing motor 222 will be inoperative unless the temperature of the water in the heating compartment 20 is at least at the selected temperature (208° F. in the construction illustrated). If the temperature is at this selected amount, thermostat 206 will have conditioned the thermostatic control 208 so that power lines 136 and 138 will be connected through thermostatic control 208 and starting switch 218, permitting the timing motor 222 to be effective.

Pilot light 228 is connected through conductors 230 and 232 to power lines 138 and 136, respectively, said pilot light merely showing that electrical energy is being supplied to the coffee making unit.

Power lines 138 and 136 of the device are adapted to be connected through a suitable exterior switch (or plug) 234 to an exterior source of electrical energy 236—238.

When it is desired to brew coffee in the machine illustrated in Figures 1 to 5, inclusive, power lines 136 and 138 of the machine are suitably connected through switch 234 to external power lines 236 and 238. Before current is supplied to the power lines 136 and 138, the machine is inoperative and valves 130, 108 and 110 are closed.

Let it be assumed that there is no water in the heating compartment 20. Closing switch 234 will cause pilot light 228 to be lighted showing power is being supplied to the urn and will supply current to conductors 136 and 138, and relay 128 of inlet valve 130 will be energized to open said valve, inasmuch as there being no water or not the proper amount of water in compartment 20, float 120 will have moved downwardly to close switch 124 so that conductor 136 will be connected through conductor 134, relay 128, conductor 126, switch 124, conductor 144, switch 142, conductor 140 to power line 138. Water will then be supplied through pipe 132, valve 130, and pipe 146, to the heating compartment 20 until it reaches the predetermined level at which time it will move float 120 to open switch 124, causing the relay 128 to become de-energized to close valve 130.

It is, of course, understood that if faucet 56 is used at any time to draw off water from compartment 20, the float 120 will again operate switch 124 to cause water to be supplied to the compartment 20 to the proper level, all as particularly hereinbefore described.

Closing switch 234 will cause heating means 148 to be energized through thermostatic control 152 and conductors 158 and 160. Heating means 148 will heat the water in the container 20 until it reaches the selected temperature (208° F.) at which time thermostat 150 will operate thermostatic control 152 to affect the heating means 148 to maintain the temperature of the water in the compartment 20 at the selected temperaure (208° F.). When the temperature of the water reaches the selected temperature, thermostat 206 will condition the thermostatic control 208 so that the starting switch 218 may be effective if operated (closed).

Let it be assumed that the proper amount of coffee has been placed in the coffee leacher 64, or basket above filter 68, and the deflector or spreader 74 put in place. Starting switch 218 may be moved to its starting position, contacting the stop 226, the position for timing the device for the selected time (for example, six minutes). Control 208 having already been conditioned by the temperature of the water in compartment 20 reaching the predetermined temperature (208° F.), timing motor 222 becomes effective, as power line 136 is connected through conductors 212 and 216, starting switch 218, conductor 180, relay 174, conductor 178, to power line 138. Selecting switch 182 will have already been moved to close one contact 184 or 186, depending on which jar is selected for the coffee making.

Let it be assumed that this selecting switch 182 has been moved to contact 196, in that case power line 136 will be connected through starting switch 218, conductor 180, switch 182, contact 196, conductor 198, solenoid 114, conductors 220 and 192 to power line 138. The circuit will also have been completed through conductor 202, selecting lamp 204, and conductor 200, to conductor 192 to show which jar has been selected.

Relay 174 being energized, switch 142 will be opened and switches 162 and 168 will be closed. The closing of switches 162 and 168 will cause heating element 148 to be directly supplied with electrical energy from power lines 136 and 138, by-passing thermostatic control 152. Thus the heating element 148 will additionally heat the water in heating compartment 20, raising the temperature above the control point (208° F.). The water in compartment 20 will reach its boiling point, plus the additional amount necessary to raise the pressure in chamber 20. Any excessive pressure above a predetermined safe amount will be relieved to the atmosphere through safety valve 88.

Inasmuch as solenoid 114 has been energized, valve 110 will have been opened, so that the increase in pressure above the water in the heating compartment 20 will cause the boiling water to flow through pipe 118, valve 110, pipe 98, to head 94 where it will spray downwardly on the perforated deflector 74, and will pass through the ground coffee 72 forming the liquid coffee which fills jar 26.

As the level falls in compartment 20, float 120 will move to a position to close switch 124, but the solenoid 128 will not become operative as switch 142 will be in open position. The boiling water will be supplied through pipe 118 until the level falls below the inlet of pipe 118, at which time a sufficient quantity of water will have been supplied to make the desired quantity of coffee in jar 26, and, of course, thereafter no more water will be supplied through pipe 118. The coffee may, of course, be withdrawn through faucet 42.

While the water is being supplied through pipe 118 to jar 26, the timing motor 222 is operating and at the time the water level in heating compartment 20 reaches the inlet of inlet pipe 118, the desired (six minute) interval has elapsed and starting switch 218 has been rendered inoperative, that is, has reached the position where the switch 218 contacts the pin 224.

When the starting switch 218 becomes inoperative after the selected (six minute) interval, it causes the relay 174 to become inoperative causing switches 162 and 168 to open, and switch 142 to close. Closing switch 142 permits power lines 136 and 138 to be connected through conductor 134, relay 128, switch 124, conductor 144, switch 142 and conductor 140 energizing relay 128, thereby opening inlet valve 130, permitting water to be supplied from a source of supply through pipe 132, valve 130, pipe 146 to compartment 20. This water supplied being colder than the water in the compartment will cause a decrease in temperature in the compartment 20 whereupon thermostat 150 will permit the control 152 to connect the heating means 148 to power lines 136 and 138, through conductors 158 and 160. This supply of cold water may also decrease the pressure and cause vacuum conditions to exist in compartment 20, but valve 88 will destroy such vacuum conditions as it will operate to permit air at atmospheric pressure to be supplied to compartment 20. The temperature of the water in the compartment 20 will then be raised to the selected temperature (208° F.) at which time the cycle is ready to be duplicated. And it will be seen that by maintaining the temperature in compartment 20 at this predetermined high that the temperature of the coffee in jars 26 is maintained at substantially a constant high.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In a coffee-making device, the combination of a casing having a closed, water heating compartment therein, a jar supported in said compartment, a draw-off connection extending outwardly of said casing and communicating with said jar, a perforated coffee leacher disposed in the top of said jar, a removable closure for said jar, a spray head disposed over said leacher, a supply pipe for said spray head connected at its outlet end to said head and having the inlet end extending into the heating compartment, the position of the inlet end of said supply pipe in said compartment determining the amount of water to be sprayed through the head to the jar in any cycle of operation, a normally closed solenoid operated supply valve in said supply pipe, a liquid level controlled switch actuated by the water in said compartment, said switch being open when the water in said compartment is at the predetermined maintained level but closed when the water is below such level, a water intake for supplying water to said compartment, said intake being adapted to be connected to a source of water supply, a normally closed solenoid operated intake valve disposed in said intake for controlling supply of water to said compartment, said intake valve being controllably connected to said liquid level controlled switch whereby when the water is at said predetermined maintained level said liquid level controlled switch is in a position to cause said intake valve to be closed and when the water level is below said predetermined maintained level, the liquid level controlled switch is in position to permit said intake valve to open, to permit supply of water through said intake to said compartment, heating means disposed in said compartment for heating the water therein, thermostatic means controlled by the temperature of the water in said compartment for causing the water in said compartment to be maintained at a normal predetermined temperature, a relay comprising a relay solenoid and a plurality of switches, one of said switches being closed when two other of said switches are open, and vice versa, said first named switch being in circuit with said liquid level controlled switch thereby permitting energization of the solenoid of the intake valve when said first named switch is closed, said second named switches being in the heating means circuit for controlling the same independently of the heater controlling thermostat, a selecting switch movable to a position to permit the solenoid of the supply valve to be energized, a starting switch provided with a timing device operable to maintain said starting switch closed for a predetermined time, said starting switch, when in closed position, permitting the relay and the solenoid of the supply valve to be energized, and a thermostatic control controlled by the temperature of the water in the compartment operable to render the starting switch and timer ineffective, said thermostatic control being operable to render the relay ineffective, and also operable to render the solenoid of the supply valve ineffective unless the temperature of the water in the compartment is above a predetermined temperature, energization of said relay causing the first named switch thereof to become open, and the second named switches thereof to become closed, thereby preventing the intake valve from opening, and causing heating of said heating means to raise the temperature of the water in the compartment above the normal predetermined temperature whereby the pressure generated by the heated water in said compartment causes the water in said compartment to flow through the supply pipe of the supply valve and be sprayed on the leacher until the predetermined amount of water has been sprayed, opening of the starting switch by the timer after the timed period causing the relay to become de-energized and the solenoid of the supply valve to become de-energized, and the solenoid of the intake valve to become energized, whereby water is supplied to said compartment through said intake and thereafter heated to the normal predetermined temperature through control by the thermostatic control.

2. In a coffee making device, the combination of a casing having a closed, water heating compartment therein, spaced jars supported in said compartment, a draw-off connection extending outwardly of said casing and communicating with the associated jar, a perforated coffee leacher disposed in the top of each jar, a removable closure for each jar, a spray head disposed over each leacher, a supply pipe for each spray head connected at its outlet end to said head and having the inlet end extending into the heating compartment, the position of the inlet end of said supply pipe in said heating compartment determining the amount of water to be sprayed through a head to the associated jar in any cycle of operation, a normally closed solenoid operated supply valve in each supply pipe, a liquid level controlled switch actuated by the water in said compartment, said switch being open when the water in said compartment is at the predetermined maintained level but closed when the water is below such level, a water intake for supplying water to said compartment, said intake being adapted to be connected to a source of water supply, a normally closed solenoid operated intake valve disposed in said intake for controlling supply of water to said compartment, said intake valve being controllably connected to said liquid level controlled switch whereby when the water is at said predetermined maintained level said liquid level controlled switch is in a position to cause said intake valve to be closed and when the water level is below said predetermined maintained level, the liquid level controlled switch is in position to permit said intake valve to open, to permit supply of water through said intake to said compartment, heating means disposed in said compartment for heating the water therein, thermostatic means controlled by the temperature of the water in said compartment for causing the water in said compartment to be maintained at a normal predetermined temperature, a relay comprising a relay solenoid and a plurality of switches, one of said switches being closed when two other of said switches are open, and vice versa, said first named switch being in circuit with said liquid level controlled switch thereby permitting energization of the solenoid of the intake valve when said first named switch is closed, said second named switches being in the heating means circuit for controlling the same independently of the heater controlling thermostat, a selecting switch movable to a position to permit the solenoid of the selected supply valve to be energized, a starting switch provided with a timing device operable to maintain said starting switch closed for a predetermined time, said starting switch, when in closed position, permitting the relay and the solenoid of the selected supply valve to be energized, and a thermostatic control controlled by the temperature of the water in the compartment operable to render the starting switch and timer ineffective, said thermostatic control being operable to render the relay ineffective, and also operable to render the solenoid of the selected supply valve ineffective unless the temperature of the water in the compartment is above a predetermined temperature, energization of said relay causing the first named switch thereof to become open, and the second named switches thereof to become closed, thereby preventing the intake valve from opening, and causing heating of said heating means to raise the temperature of the water in the compartment above the normal predetermined temperature whereby the pressure generated by the heated water in said compartment causes the water in said compartment to flow through the supply pipe of the selected supply valve and be sprayed on the associated leacher until the predetermined amount of water has been sprayed, opening of the starting switch by the timer after the timed period causing the relay to become de-energized and the solenoid of the selected supply valve to become de-energized, and the solenoid of the intake valve to become energized, whereby water is supplied to said compartment through said intake and thereafter heated to the normal predetermined temperature through control by the thermostatic control, and indicating means for showing that the device is energized and to show the selection of the jar to which water is to be sprayed.

3. In a coffee making device, the combination of a casing having a closed, water heating compartment therein, a jar supported in said casing, a draw-off connection from said jar extending outwardly of said casing, a perforated coffee leacher disposed in said jar, a supply pipe having an outlet for delivering water from said compartment to said jar, the inlet end of said supply pipe extending into the heating compartment, the position of the inlet end of said supply pipe in said compartment determining the amount of water to be supplied to said jar in any cycle of operation, a normally closed solenoid operated supply valve in said supply pipe, a liquid level controlled switch actuated by the water in said compartment, said switch being open when the water in said compartment is at the predetermined maintained level but closed when the water is below such level, a water intake for supplying water to said compartment, said intake being adapted to be connected to a source of water supply, a normally closed solenoid operated intake valve disposed in said intake for controlling supply of water to said compartment, said intake valve being controllably connected to said liquid level controlled switch whereby when the water is at said predetermined maintained level said liquid level controlled switch is in a position to cause said intake valve to be closed and when the water level is below said predetermined maintained level, the liquid level controlled switch is in position to permit said intake valve to open, to permit supply of water through said intake to said compartment, heating means disposed in said compartment for heating the water therein, thermostatic means controlled by the temperature of the water in said compartment for causing the water in said compartment to be maintained at a normal predetermined temperature, a relay comprising a relay solenoid and a plurality of switches, one of said switches being closed when two other of said switches are open, and vice versa, said first named switch being in circuit with said liquid level controlled switch thereby permitting energization of the solenoid of the intake valve when said first named switch is closed, said second named switches being in the heating means circuit for controlling the same independently of the heater controlling thermostat, a selecting switch movable to a position to permit the solenoid of the supply valve to be energized, a starting switch provided with a timing device operable to maintain said starting switch closed for a predetermined time, said starting switch, when in closed position, permitting the relay and the solenoid of the supply valve to be energized, and a thermostatic control controlled by the temperature of the water in the compartment operable to render the starting switch and timer ineffective, said thermostatic control being operable to render the relay ineffective, and also operable to render the solenoid of the supply valve ineffective unless the temperature of the water in the compartment is above a predetermined temperature, energization of said relay causing the first named switch thereof to become open, and the second named switches thereof to become closed, thereby preventing the intake valve from opening and causing heating of said heating means to raise the temperature of the water in the compartment above the normal predetermined temperature whereby the pressure generated by the heated water in said compartment causes the water in said compartment to flow through the supply pipe of the supply valve and be sprayed on the leacher until the predetermined amount of water has been sprayed, opening of the starting switch by the timer after the timed period causing the relay to become de-energized and the solenoid of the supply valve to become de-energized, and the solenoid of the intake valve to become energized, whereby water is supplied to said compartment through said intake and thereafter heated to the normal predetermined temperature through control by the thermostatic control.

CHRISTOS W. ZEES.

REFERENCES CITED

The following references are of record in the file of this patent:

UNITED STATES PATENTS

| Number | Name | Date |
| --- | --- | --- |
| 1,470,584 | Krentz | Oct. 9, 1923 |
| 1,552,565 | Morton et al. | Sept. 8, 1925 |
| 1,621,620 | Bast | Mar. 22, 1927 |
| 1,658,579 | Strohback | Feb. 7, 1928 |
| 1,796,518 | Glascock | Mar. 17, 1931 |
| 1,822,433 | Brand | Sept. 8, 1931 |
| 1,882,247 | Levings | Oct. 11, 1932 |
| 2,169,852 | Scott | Aug. 15, 1939 |
| 2,169,880 | McNeil | Aug. 15, 1939 |
| 2,206,424 | Oyen | July 2, 1940 |
| 2,315,777 | Denton | Apr. 6, 1943 |
| 2,340,070 | McCauley et al. | Jan. 25, 1944 |
| 2,367,851 | Eaton | Jan. 23, 1945 |
| 2,485,246 | Swanson | Oct. 18, 1949 |
| 2,488,817 | Kaminky | Nov. 22, 1949 |